(12) United States Patent
Browning et al.

(10) Patent No.: US 8,032,887 B2
(45) Date of Patent: Oct. 4, 2011

(54) METHOD AND APPARATUS FOR ALLOWING RESTARTED PROGRAMS TO USE OLD PROCESS IDENTIFICATION

(75) Inventors: Luke Matthew Browning, Austin, TX (US); Kenneth Bernard Rozendal, Austin, TX (US); Suresh Eswara Warrier, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1424 days.

(21) Appl. No.: 11/463,775

(22) Filed: Aug. 10, 2006

(65) Prior Publication Data

US 2008/0109827 A1 May 8, 2008

Related U.S. Application Data

(62) Division of application No. 09/620,722, filed on Jul. 20, 2000, now Pat. No. 7,117,354.

(51) Int. Cl.
*G06F 9/46* (2006.01)
*G06F 3/00* (2006.01)

(52) U.S. Cl. ........................ 718/102; 719/320

(58) Field of Classification Search .................. 718/100, 718/102
See application file for complete search history.

(56) References Cited

U.S. PATENT DOCUMENTS

| 4,697,266 | A | | 9/1987 | Finley |
| 5,313,647 | A | | 5/1994 | Kaufman et al. |
| 5,321,841 | A | * | 6/1994 | East et al. .................. 718/107 |
| 5,603,020 | A | | 2/1997 | Hashimoto et al. |
| 5,721,915 | A | * | 2/1998 | Sockut et al. .................. 1/1 |
| 5,828,821 | A | | 10/1998 | Hoshina et al. |
| 5,832,283 | A | * | 11/1998 | Chou et al. .................. 713/300 |
| 5,892,944 | A | * | 4/1999 | Fukumoto et al. .................. 718/100 |
| 6,044,475 | A | | 3/2000 | Chung et al. |
| 6,067,623 | A | * | 5/2000 | Blakley et al. .................. 726/5 |
| 6,115,830 | A | | 9/2000 | Zabarsky et al. |
| 6,272,631 | B1 | * | 8/2001 | Thomlinson et al. .................. 713/155 |
| 6,594,821 | B1 | | 7/2003 | Banning et al. |
| 7,124,403 | B2 | | 10/2006 | Price et al. |

FOREIGN PATENT DOCUMENTS

| DE | 19835177 A1 | 10/2000 |
| JP | 04264655 A | 9/1992 |

* cited by examiner

*Primary Examiner* — Meng An
*Assistant Examiner* — Blake Kumabe
(74) *Attorney, Agent, or Firm* — Yee & Associates, P.C.; David A. Mims, Jr.

(57) ABSTRACT

A data processing system allows processes to be checkpointed and restarted. The system saves the old process and thread identifications in a process table. When an application makes a system call passing the old process and/or thread identifications as parameters, the system performs a mapping algorithm to supply the system call with the new process and/or thread identifications. When a system call returns a new identification, the system performs a remapping algorithm to return the old identifications to the calling application program. When a group of process is restarted for which the process group leader was not checkpointed, the system creates a ghost process group leader.

16 Claims, 6 Drawing Sheets

Figure 1
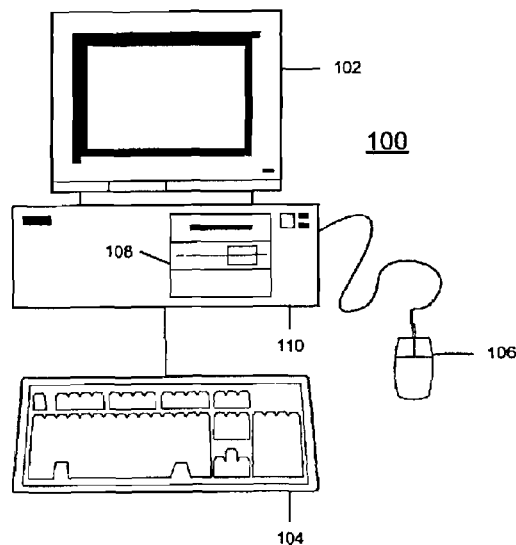
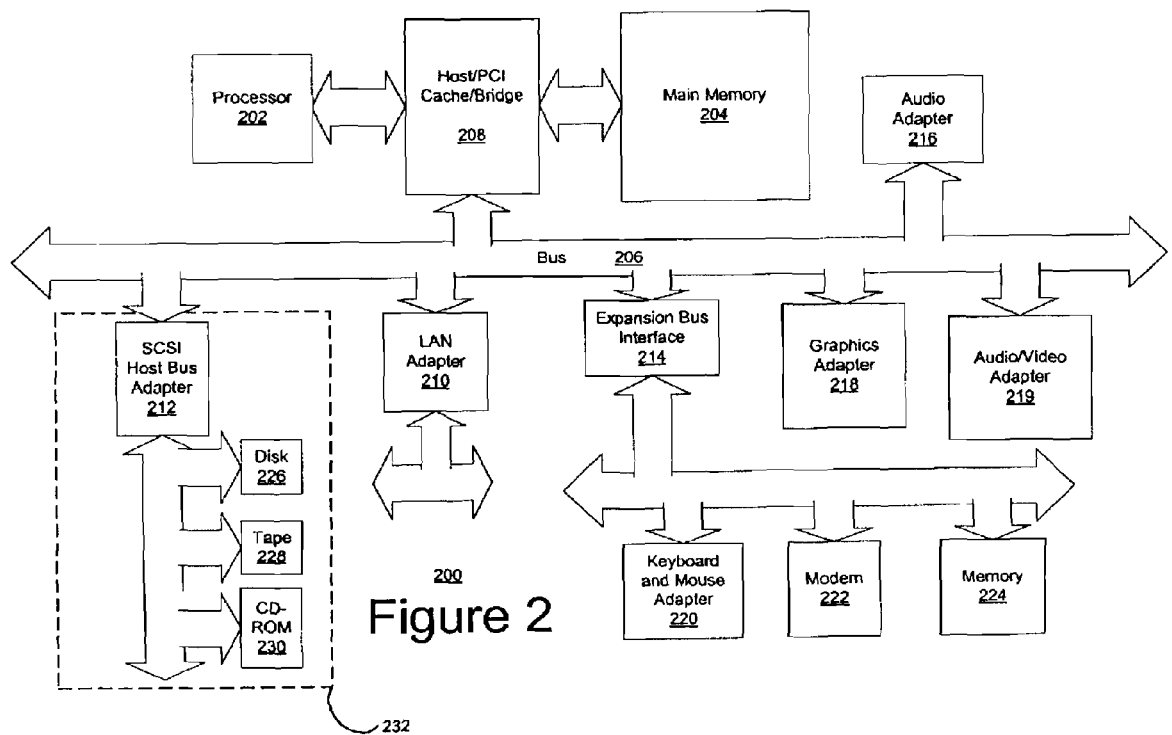
Figure 2

METHOD AND APPARATUS FOR ALLOWING RESTARTED PROGRAMS TO USE OLD PROCESS IDENTIFICATION

This application is a divisional of application Ser. No. 09/620,722, filed Jul, 20, 2000 now U.S. Pat. No. 7,117,354, status allowed, which is herein incorporated by reference.

BACKGROUND OF THE INVENTION

1. Technical Field

The present invention relates to an improved data processing system and, in particular, to a method and apparatus for restarting a program or programs. Still more particularly, the present invention provides a method and apparatus for restarting programs and allowing them to continue to use old process identifications and thread identifications.

2. Description of Related Art

A computer program, also referred to as software, is a set of instructions that directs the functioning of various computer hardware resources in order to accomplish a particular task. In order to run a computer program, that program is typically loaded into the computer's main memory, where each instruction within the program is stored at a unique location, specified by an address.

A checkpoint is a snapshot of the image of a process, which is saved on non-volatile storage and which survives process failure. The checkpoint/restart facilities save information, such as checkpoint data, necessary to restart the execution of a program from that point in the program execution at which the information is saved. Upon recovery, the checkpoint can be reloaded into volatile memory, and the process can resume execution from the checkpointed state. Many applications, especially scientific applications, are computer intensive and often take days or weeks to complete successfully. These applications often do not contain any means of saving temporary results and a failure of any sort, such as power, disks, communication, and system crash, will result in loss of all work done until the failure. Checkpoint/restart capability is a service by which the application status can be saved or "checkpointed" and later—if some failure occurs—be resumed or "restarted."

Many system calls take a process or thread ID as a parameter or return an ID on a successful system call. For example the "kill" system call in Unix takes the process ID of the process to which a signal is to be sent. And the "getppid" returns the process ID of the parent process or the process which created the calling process.

A problem encountered in restarting processes whose states have been saved when they were checkpointed is that the system cannot guarantee assigning them the same process identifications (IDs) and thread Ids. This is because some processes or threads may have already been assigned any one of those process IDs or thread IDs at the time the checkpointed processes are being restarted.

In addition, if any of the process group leaders of any process being checkpointed was not itself checkpointed, the original process group ID of that restarted process may now be taken up by another process.

However, programs often save their process IDs and thread IDs in program variables for reuse to avoid making a system call each time they need their process ID or thread ID. Further, they often communicate their IDs to other processes in the application to facilitate inter-process communication. Therefore, a need exists in the art to allow restarted processes to continue to use their old process Ids and thread Ids even though the Ids assigned by the system now differ.

SUMMARY OF THE INVENTION

The present invention uses virtual process IDs, virtual thread IDs, and ghost process group leaders to solve the disadvantages of the prior art. A virtual process ID, which is the process ID of the process when it was checkpointed is associated with every restarted process. A virtual thread ID, which is the thread ID of the thread when it was checkpointed, is associated with every restarted thread. A ghost process group leader is associated with every restarted process the process group leader of which was not restarted along with it. Because the process group leader no longer exists at restart time, a ghost process group leader is created as a "zombie" process whose virtual process ID is assigned a value equal to the old process group ID of the restarted processes.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a data processing system in which the present invention may be implemented;

FIG. 2 is a block diagram of a data processing system is shown in which the present invention may be implemented;

DETAILED DESCRIPTION OF THE PREFERRED EMBODIMENT

Figure 3A:
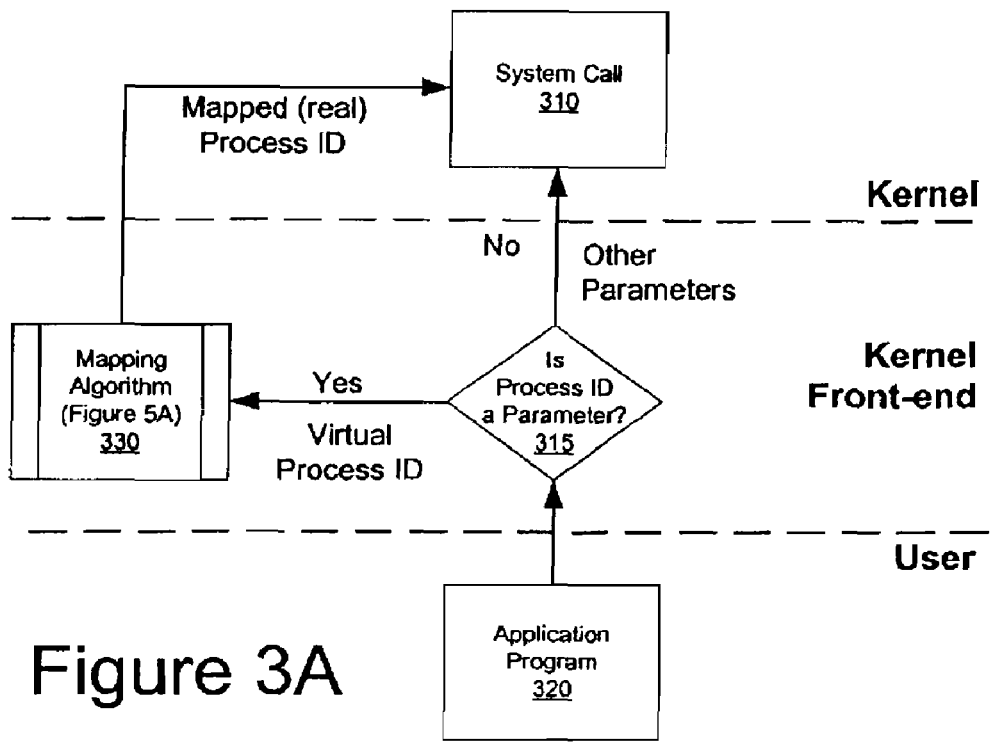
FIGS. 3A and 3B are data flow diagrams illustrating the operation of a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y.

Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a Personal Digital Assistant (PDA) device which is configured with ROM and/or flash ROM in order to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The operating system creates software copies of the processor and the memory and assigns them to programs. Each instance of a program executing in memory is called a "process." A program is thus a passive entity, such as the contents of a file stored on disk, whereas a process is an active entity. The process includes the value of the "program counter" specifying the next instruction to execute, the contents of processor's registers, the process "stack," a data section containing global values, and a "user block" which contains information about opened files and devices, pending signals, signal handlers, etc. The process stack contains temporary data, such as sub-routine parameters, return addresses, and temporary variables. The "process image" defines a process in memory and includes all information about a process as described above.

The operating system will allow a process to create new processes by use of a system call. The relationship between processes is often referred to as the parent-child relationship with the calling process referred to as the parent of the created process, which is called the child process. For example, a word processing program executes in memory as a process. When the word processing process calls a spell checker program, a child process is created whose parent is the word processing program.

A checkpoint is a snapshot of the status of an application which is saved on non-volatile storage, such as disk 226 in FIG. 2, and which survives process failure. The checkpoint/restart facilities save information (i.e., checkpoint data) necessary to restart the execution of all processes belonging to an application from that point in the program execution at which the information is saved. Upon recovery, the checkpoint can be reloaded into volatile memory, such as main memory 204 in FIG. 2, and the processes can resume execution from the checkpointed state.

Each process is assigned a process ID (pid) at creation. When processes are restarted from a checkpoint, the processes and threads are assigned new IDs that may differ from the process IDs and thread IDs at checkpoint. The present invention keeps track of the process IDs and thread IDs at checkpoint as "virtual" process IDs and virtual thread IDs.

With reference now to FIG. 3A, a data flow diagram is shown illustrating the operation of a preferred embodiment of the present invention with respect to process IDs. The process shown in FIG. 3A manages parameters between an application program and a system call so that the application program is able to use the old process IDs. The same basic data flow diagram works equally well for thread IDs although the description refers to only process Ids for ease of discussion.

A system call 310 is made by application program 320. The application program does not know whether processes have been restarted; therefore, application program passes old (virtual) saved process IDs as parameters. A determination is made as to whether a process ID is a parameter of the system call (step 315). If a process ID is not a parameter, the parameters are passed to system call 310. If a process ID is a parameter, mapping algorithm 330 maps the virtual process ID to a real process ID and the result is passed to system call 310. The detailed operation of the mapping algorithm according to preferred embodiment of the present invention will be described in more detail below with respect to FIG. 5A.

Figure 3B:
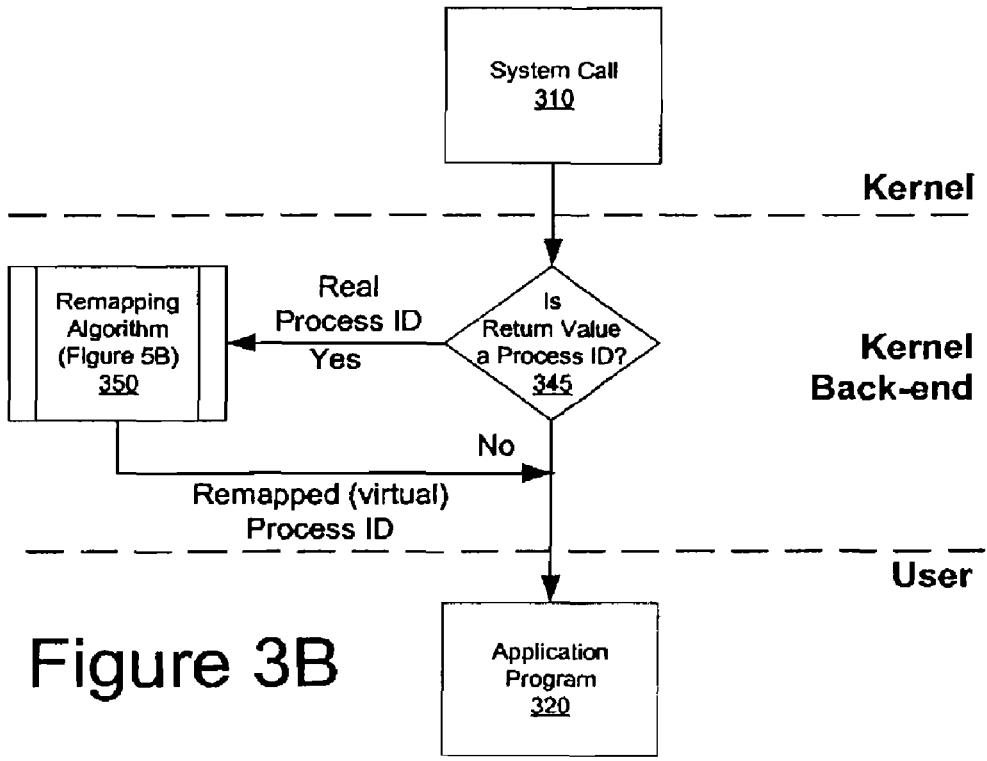

Turning now to FIG. 3B, a data flow diagram is shown illustrating the operation of a preferred embodiment of the present invention. The process shown in FIG. 3B manages values returned from a system call so that the application program is able to receive old process IDs.

When system call 310 is made by application program 320, values are returned from the system call to the application program. A determination is made as to whether a returned value is a process ID (step 345). If returned values are not process IDs, the values are returned directly to application program 320. However, if a returned value is a process ID, remapping algorithm 350 remaps the real process ID returned by system call 310 to a virtual process ID known by application program 320. The detailed operation of the remapping algorithm according to preferred embodiment of the present invention will be described in more detail below with respect to FIG. 5B.

When a process is checkpointed, the process ID and other IDs, such as the parent process ID, session leader ID, and group leader ID, are saved in the checkpoint file. When the process is restarted, these IDs are saved as virtual values in new fields added to the process table, which differ from the new values assigned to the process when it is created at restart. The restarted processes are linked with a new field in the process table, which can be traversed to identify all processes, which belong to the set of restarted processes. The restarted processes have the same checkpoint/restart group ID (CRID).

Figure 4:
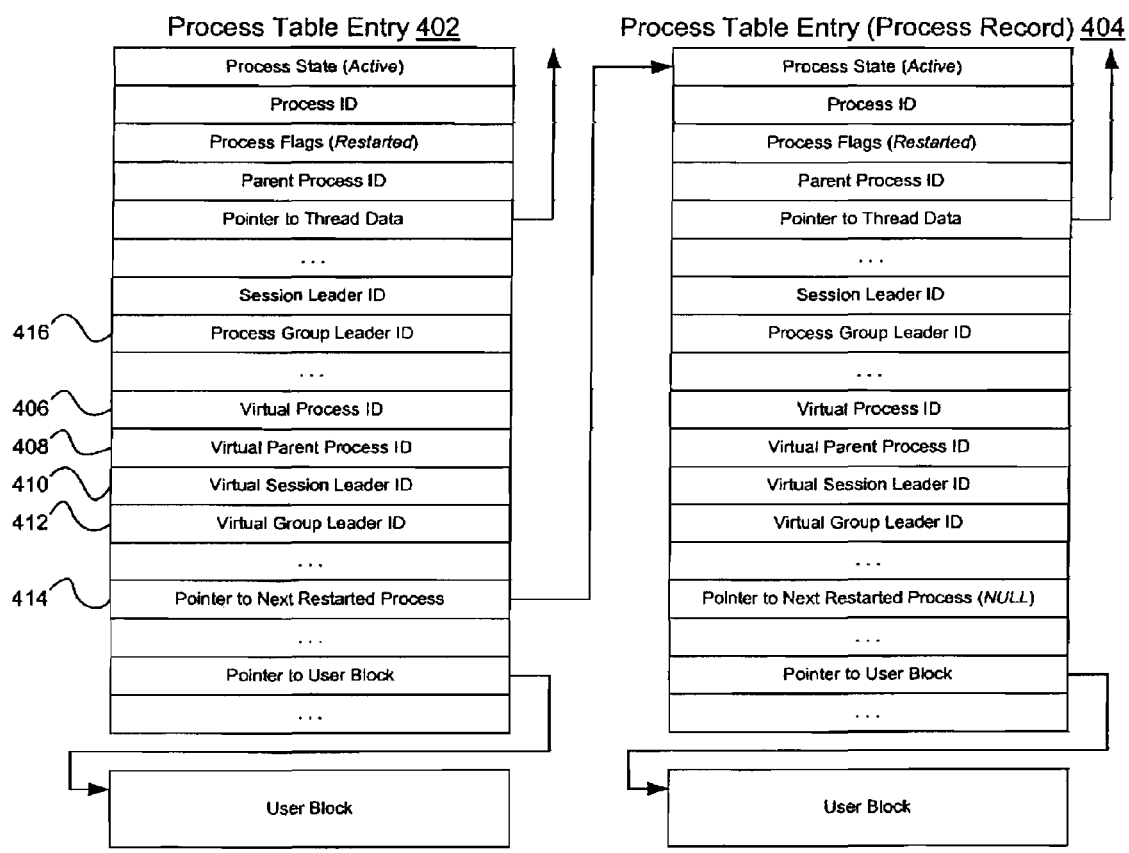
FIG. 4 illustrates a process table in accordance with a preferred embodiment of the present invention.

Turning now to FIG. 4, a process table is shown in accordance with a preferred embodiment of the present invention. All the information about each process, other than the address space of the process, is stored in a process table, which is an array or linked list of structures, one for each process currently in existence. According to a preferred embodiment of the present invention, the process table demonstrated in FIG. 4 has been modified to store information to facilitate management of virtual process IDs to allow processes to use old process IDs.

A two-process restarted group is represented in table 400. The first process in the group is represented by process table entry 402. According to a preferred embodiment of the present invention, each table entry includes a virtual process ID 406. The virtual process ID is the process ID of the process when it was checkpointed. The process table entry also includes a virtual parent process ID 408, virtual session leader ID 410, and a virtual group leader ID 412. The virtual parent process ID, virtual session leader ID, and virtual group leader ID are the IDs of the processes when they were checkpointed. The pointer to the next restarted process 414 for process table entry 402 points to the process table entry for the second restarted process 404. According to a preferred embodiment, the pointer to the next restarted process is used to link the processes in the checkpoint/restart group so that the mapping and remapping algorithms can cycle through the restarted processes to identify virtual or real process IDs.

Figure 5A:
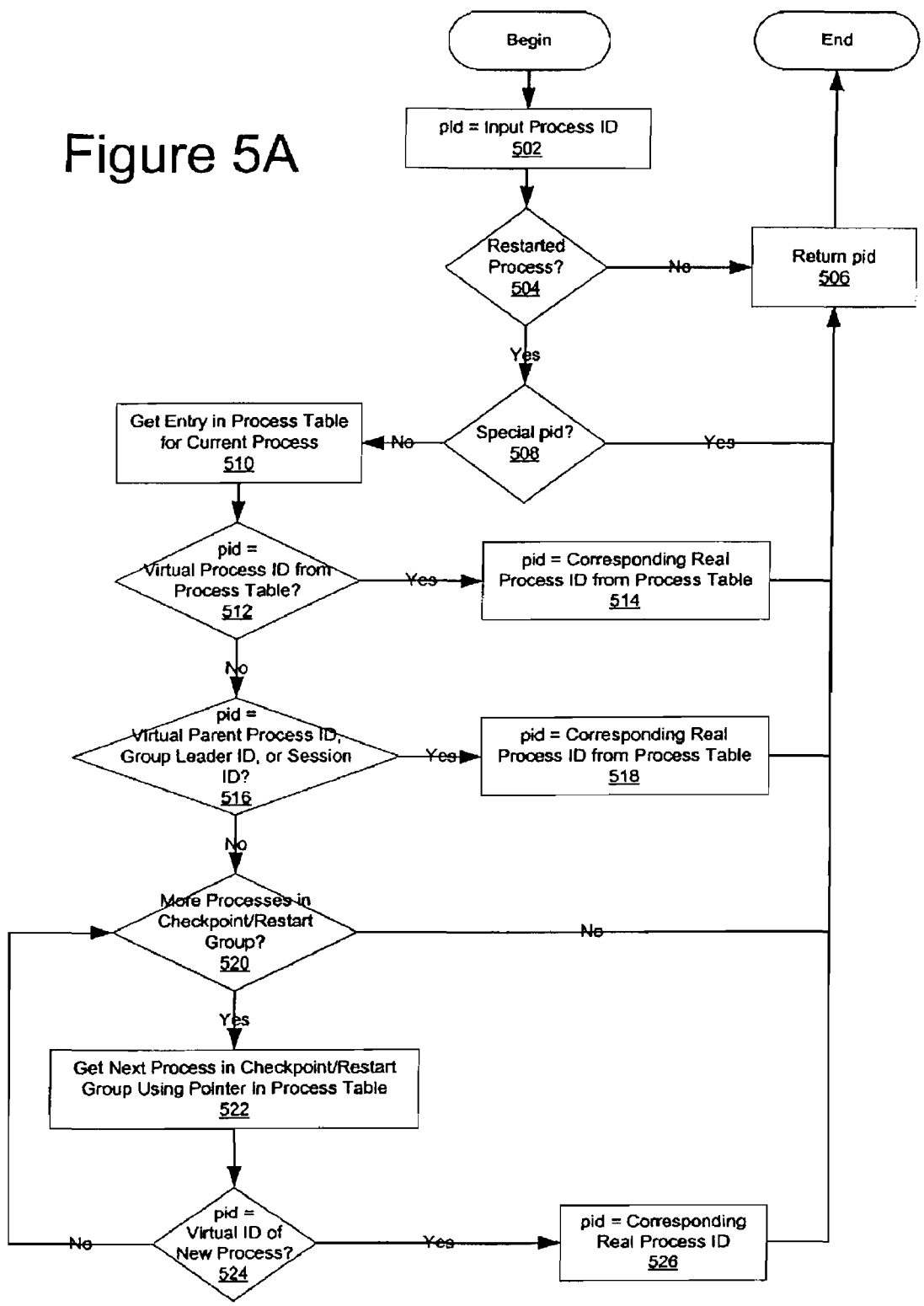
FIG. 5A is a flowchart of the operation of a mapping algorithm in accordance with a preferred embodiment of the present invention.

Turning now to FIG. 5A, a flowchart of the operation of a mapping algorithm is illustrated in accordance with a preferred embodiment of the present invention. The process of the mapping algorithm ensures that a process ID passed as a parameter in a system call is a real process ID, rather than a virtual process ID, which was the value of the process ID at checkpoint.

The mapping process begins and sets the input parameter 'pid' to be equal to the input virtual process ID from the parameter passed by application program 320 in FIG. 3 (step 502). A determination is made as to whether the calling process is a restarted process (step 504). If the process is not a restarted process, no mapping is necessary and the pid is returned (step 506) and the mapping process ends.

If the process is a restarted process in step 504, a determination is made as to whether the pid corresponds to a special process (step 508), such as an init process, a swapper, etc. If the pid corresponds to a special process, no mapping is necessary and the pid is returned (step 506) and the mapping process ends.

If the pid does not correspond to a special process in step 508, the mapping process gets the entry in the process table for the current process (step 510) and a determination is made as to whether pid is equal to the virtual process ID from the process table (step 512). If pid is equal the virtual process ID, pid is set to the corresponding real process ID from the process table entry (step 514). Next, the mapping process returns pid (step 506) and ends.

If the pid is not equal to the virtual process ID in step 512, a determination is made as to whether the pid is equal to the virtual parent process ID, virtual group leader ID, or virtual session ID (step 516). If pid is equal to one of the above values, pid is set to the corresponding real ID from the process table entry (step 518). Thereafter, the mapping process returns pid (step 506) and ends.

If the pid is not equal to the virtual parent process ID, virtual group leader ID, or virtual session ID in step 516, a determination is made as to whether more processes exist in the checkpoint/restart group (step 520). If the pointer to the next restarted process 414 in FIG. 4 is "NULL", then more processes do not exist and no mapping is necessary. Thus, the mapping process returns pid (step 506) and ends.

If more processes exist in the checkpoint/restart group in step 520, the mapping process gets the next process using the pointer in the process table (step 522) and a determination is made as to whether pid is equal to the virtual process ID of the new process (step 524). If pid is not equal to the virtual ID, the mapping process returns to step 520 to determine whether more processes exist in the checkpoint/restart group. If pid is equal to the virtual process ID of the new process in step 524, pid is set to the corresponding real process ID (step 526). Next, the mapping process returns pid (step 506) and ends.

Figure 5B:
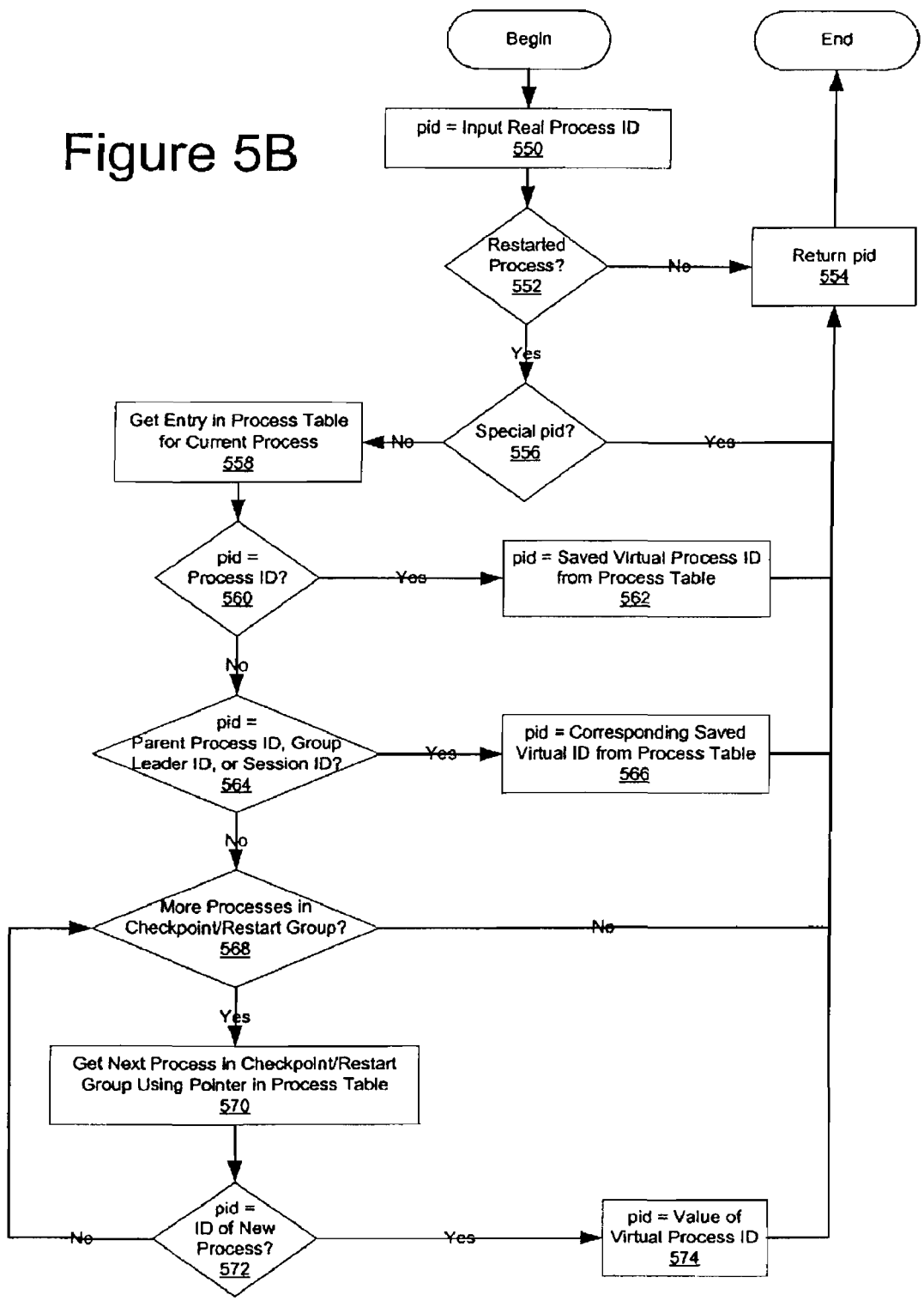
FIG. 5B is a flowchart of the operation of a remapping algorithm in accordance with a preferred embodiment of the present invention.

Turning now to FIG. 5B, a flowchart of the operation of a remapping algorithm is illustrated in accordance with a preferred embodiment of the present invention. The process of the remapping algorithm ensures that a process ID returned as values from a system call corresponds to the virtual process ID, which was the value of the process ID at checkpoint.

The remapping process begins and sets the input parameter 'pid' to be equal to the input real process ID returned from the system call 310 in FIG. 3 (step 550). A determination is made as to whether the process corresponding to pid is a restarted process (step 552). If the process is not a restarted process, no remapping is necessary and the pid is returned (step 554) and the remapping process ends.

If the process is a restarted process in step 552, a determination is made as to whether the pid corresponds to a special process (step 556), such as an init process, a swapper, etc. If the pid corresponds to a special process, no remapping is necessary and the pid is returned (step 554) and the remapping process ends.

If the pid does not correspond to a special process in step 556, the remapping process gets the entry in the process table for the current process (step 558) and a determination is made as to whether pid is equal to the process ID from the process table (step 560). If pid is equal the process ID, pid is set to the corresponding saved virtual process ID from the process table entry (step 562). Next, the remapping process returns pid (step 554) and ends.

If the pid is not equal to the process ID in step 560, a determination is made as to whether the pid is equal to the parent process ID, group leader ID, or session ID (step 564). If pid is equal to one of the above values, pid is set to the corresponding virtual ID from the process table entry (step 566). Thereafter, the remapping process returns pid (step 554) and ends.

If the pid is not equal to the parent process ID, group leader ID, or session ID in step 564, a determination is made as to whether more processes exist in the checkpoint/restart group (step 568). If the pointer to the next restarted process 414 in FIG. 4 is "NULL", then no more processes exist and no remapping is necessary. Thus, the remapping process returns pid (step 554) and ends.

If more processes exist in the checkpoint/restart group in step 568, the remapping process gets the next process using the pointer in the process table (step 570) and a determination is made as to whether pid is equal to the process ID of the new process (step 572). If pid is not equal to the process ID, the remapping process returns to step 568 to determine whether more processes exist in the checkpoint/restart group. If pid is equal to the process ID of the new process in step 572, pid is set to the corresponding virtual process ID (step 574). Next, the remapping process returns pid (step 554) and ends.

The similar problem for thread IDs is easier to solve because all system calls, which pass or return virtual thread IDs do so only in the context of the same process. Therefore, the present invention simply saves the virtual thread IDs in the thread table for each restarted thread. Mapping and remapping algorithms for thread IDs then involve cycling through all the threads in the process and checking the real and virtual thread IDs and then translating as necessary between real and virtual IDs.

In addition, a restarted process may be a member of a process group. Often, several processes will run simultaneously. One process, typically the first process created, is the group leader. If the process group leader of any process being checkpointed was not itself checkpointed, the original process group ID of that restarted process may be taken up by another process at restart. Therefore, the restarted processes will have no way of knowing whether the process group leader still exists. The present invention creates a "ghost" process group leader and associates the ghost process group leader with every restarted process the process group leader of which was not checkpointed with the process. The ghost process group leader is created as a zombie process the virtual process ID of which is assigned the value equal to the process group ID of the restarted process when it was checkpointed.

Under normal operation, when a process dies, the process becomes a "zombie." A zombie process is a process that has terminated, but remains as an entry in the process table. Zombie processes consume almost no resources and exist so that the parent process of the zombie can retrieve the zombie's exit status and resource usage statistics. Periodically, the scheduler process or another kernel process will "harvest" the zombies, or release their process table entries. One situation in which a zombie process will remain in the process table is when the process was a group leader and at least one other process in the group is still alive. Thus, upon restart, the remaining processes in the group refer to a group leader, even though the group leader was a zombie and was not checkpointed. According to a preferred embodiment of the present invention, a ghost process group leader is created as a zombie process so that the restarted processes have a group leader for which the virtual process ID is known.

Figure 6:
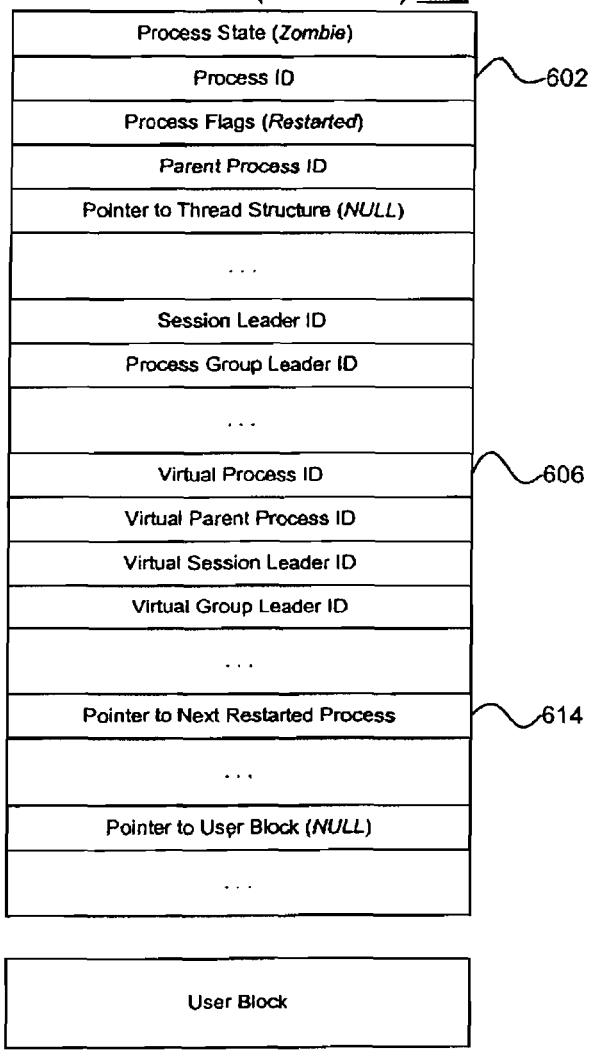
FIG. 6 illustrates a process table for a ghost zombie process group leader according to a preferred embodiment of the present invention; and, FIG. 7 is a flowchart illustrating the creation of a ghost zombie process group leader in accordance with a preferred embodiment of the present invention.

With reference now to FIG. 6, a process table for a ghost zombie process group leader is shown according to a preferred embodiment of the present invention. Process 600 is created as a zombie process with most fields being NULL. The process is assigned a process ID 602 at creation. The virtual process ID field 606 is assigned the value from the virtual group leader ID field 412 in FIG. 4. The process group leader ID field in each entry of process table 400 in FIG. 4 is assigned the value of the process ID 602 of the ghost group leader. The ghost zombie process group leader is linked to the rest of the restarted processes using the pointer to the next restarted process 614.

Figure 7:
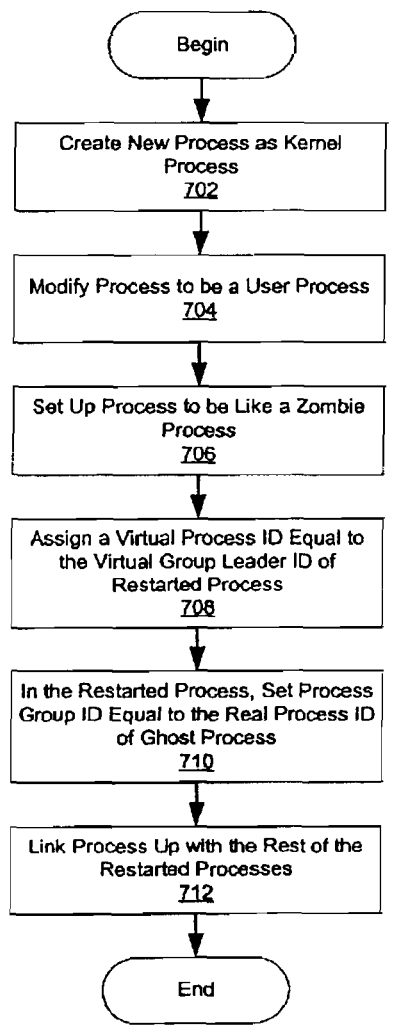

With respect now to FIG. 7, a flowchart is shown illustrating the creation of the ghost zombie process group leader in accordance with a preferred embodiment of the present invention. The creation process begins and creates a new process as a kernel process (step 702) and modifies the process to be a user process (step 704).

Creation of a new user process is normally very expensive because it involves copying data regions and mapping other regions. For the purpose of setting up a ghost process leader, normal creation of a new user process would result in a waste or resources, because all the resources associated with the process need to be released. Therefore, according to a preferred embodiment of the present invention, the process is initially created as kernel process which simplifies process creation, because creation of a kernel process does not involve any copying or mapping of regions. Modifying a kernel process to run as a user process is a trivial operation. Next, the process is set up to be a zombie process (step 706). By setting the process up to be a zombie process, the process is indicated as being dead; however, the zombie process is still treats as the process group leader by the operating system.

The creation process then assigns a virtual process ID equal to the virtual group leader ID from the process table entries of the restarted processes (step 708). In each restarted process, the creation process sets the process group leader ID to be equal to the real process ID of the created ghost process (step 710). Thereafter, the creation process links the ghost process with the rest of the restarted processes using the pointer to the next restarted process (step 712). By linking the ghost process group leader with the other restarted processes, the mapping and remapping algorithms will consider the process group leader along with the other restarted processes.

Thus, the present invention solves the disadvantages of the prior art by storing a virtual process ID, which is the process ID of the process when it was checkpointed is associated with every restarted process. A virtual thread ID, which is the thread ID of the thread when it was checkpointed, is associated with every restarted thread. A ghost process group leader is created and associated with every restarted process the process group leader of which was not restarted along with the process. The ghost process group leader is created as a "zombie" process the virtual process ID of which is assigned a value equal to the process group ID of the restarted process when it was checkpointed.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, while the description of the invention and any examples herein may be specific to the UNIX operating system, a person of ordinary skill in the art will recognize that the present invention may be implemented in any operating system. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for making a system call by a program executing on the data processing system, comprising:
   the data processing system receiving the system call from the program, the system call comprising a parameter that includes an input process identification;
   responsive to the receiving of the system call, the data processing system mapping the input process identification to a real process identification that identifies a process executable by the data processing system; and
   responsive to the mapping of the input process identification to the real process identification, the data processing system passing the real process identification in lieu of the input process identification as the parameter of the system call, wherein the step of mapping the input process identification to the real process identification comprises:
   the data processing system receiving a first process entry for a first process in a group from a process table comprising process information for processes existing in the data processing system; and
   the data processing system determining whether the input process identification is equal to a virtual process identification stored in the first process entry, wherein the virtual process identification is a previous process identifier for a previously checkpointed process; and
   the data processing system outputting a corresponding real process identification in response to the input process identification being equal to the virtual process identification.

2. The method of claim 1, wherein the step of mapping the input process identification to a real process identification further comprises:
   determining whether the input process identification is equal to one of a virtual parent process identification, a virtual group leader identification, and a virtual session identification for the first process; and
   outputting a corresponding real parent process identification, real virtual group leader identification, or real session identification from the first process entry in response to the input process identification being equal to the one of a virtual parent process identification, a virtual group leader identification, and a virtual session identification.

3. The method of claim 1, wherein the step of mapping the input process identification to a real process identification further comprises:
   determining whether the group includes a second process entry in response to the input process identification not being equal to a virtual process identification stored in the first process entry; and
   outputting the input process identification in response to the group not including a second process.

4. The method of claim 3, wherein the step of mapping the input process identification to a real process identification further comprises:
   receiving a second process entry for a second process in the group in response to the group including a second process; and
   determining whether the input process identification is equal to a second virtual process identification stored in the second process entry; and
   outputting a corresponding real process identification in response to the input process identification being equal to the second virtual process identification.

5. A method in a data processing system for returning a value from a system call to a program executing on the data processing system, comprising:
   the data processing system receiving an input process identification as a returned value from a system call;
   responsive to the receiving of the input process identification, the data processing system remapping the input process identification to an old process identification that previously identified a process at a time of checkpoint of the process; and
   responsive to the remapping of the input process identification to the old process identification, the data processing system passing the old process identification in lieu of the input process identification as the return value, wherein the step of remapping the process identification to an old process identification comprises:
   receiving a first process entry for a first process in a group from a process table comprising process information for processes existing in the data processing system; and
   determining whether the input process identification is equal to a real process identification stored in the first process entry, wherein the real process identification is a current process identifier that identifies a previously checkpointed process; and
   outputting the old process identification in response to the input process identification being equal to the real process identification.

6. The method of claim 5, wherein the step of remapping the process identification to an old process identification further comprises:
   determining whether the input process identification is equal to one of a real parent process identification, a real group leader identification, and a real session identification for the first process; and
   outputting a corresponding old parent process identification, old virtual group leader identification, or old session identification from the first process entry in response to the input process identification being equal to the one of a real parent process identification, a real group leader identification, and a real session identification.

7. The method of claim 5, wherein the step of remapping the process identification to an old process identification further comprises:
    determining whether the group includes a second process entry in response to the input process identification not being equal to a real process identification stored in the first process entry; and
    outputting the input process identification in response to the group not including a second process.

8. The method of claim 7, wherein the step of remapping the process identification to an old process identification further comprises:
    receiving a second process entry for a second process in the group in response to the group including a second process; and
    determining whether the input process identification is equal to a second real process identification stored in the second process entry; and
    outputting a corresponding old process identification in response to the input process identification being equal to the second real process identification.

9. An apparatus for making a system call by a program executing on a data processing system, comprising:
    a data processor coupled to a memory and operable for executing instructions in the memory to perform steps of:
    receiving the system call from the program, the system call comprising a parameter that includes an input process identification;
    responsive to the receiving of the system call, mapping the input process identification to a real process identification that identifies a process executable by the data processing system; and
    responsive to the mapping of the input process identification to the real process identification, passing the real process identification in lieu of the input process identification as the parameter of the system call, wherein the mapping the input process identification to a real process identification comprises:
    receiving a first process entry for a first process in a group from a process table comprising process information for processes existing in the data processing system; and
    determining whether the input process identification is equal to a virtual process identification stored in the first process entry, wherein the virtual process identification is a previous process identifier for a previously checkpointed process; and
    outputting a corresponding real process identification in response to the input process identification being equal to the virtual process identification.

10. The apparatus of claim 9, wherein the mapping the input process identification to a real process identification further comprises:
    determining whether the input process identification is equal to one of a virtual parent process identification, a virtual group leader identification, and a virtual session identification for the first process; and
    outputting a corresponding real parent process identification, real virtual group leader identification, or real session identification from the first process entry in response to the input process identification being equal to the one of a virtual parent process identification, a virtual group leader identification, and a virtual session identification.

11. The apparatus of claim 9, wherein the mapping the input process identification to a real process identification further comprises:
    determining whether the group includes a second process entry in response to the input process identification not being equal to a virtual process identification stored in the first process entry; and
    outputting the input process identification in response to the group not including a second process.

12. The apparatus of claim 11, wherein the mapping the input process identification to a real process identification further comprises:
    receiving a second process entry for a second process in the group in response to the group including a second process; and
    determining whether the input process identification is equal to a second virtual process identification stored in the second process entry; and
    outputting a corresponding real process identification in response to the input process identification being equal to the second virtual process identification.

13. An apparatus for returning a value from a system call to a program executing on a data processing system, comprising:
    a data processor coupled to a memory and operable for executing instructions in the memory to perform steps of:
    receiving an input process identification as a returned value from a system call;
    responsive to the receiving of the input process identification, remapping the input process identification to an old process identification that previously identified a process at a time of checkpoint of the process; and
    responsive to the remapping of the input process identification to the old process identification, passing the old process identification in lieu of the input process identification as the return value, wherein the remapping the process identification to an old process identification comprises:
    receiving a first process entry for a first process in a group from a process table comprising process information for processes existing in the data processing system; and
    determining whether the input process identification is equal to a real process identification stored in the first process entry, wherein the real process identification is a current process identifier that identifies a previously checkpointed process; and
    outputting the old process identification in response to the input process identification being equal to the real process identification.

14. The apparatus of claim 13, wherein the remapping the process identification to an old process identification further comprises:
    determining whether the input process identification is equal to one of a real parent process identification, a real group leader identification, and a real session identification for the first process; and
    outputting a corresponding old parent process identification, old virtual group leader identification, or old session identification from the first process entry in response to the input process identification being equal to the one of a real parent process identification, a real group leader identification, and a real session identification.

15. The apparatus of claim 13, wherein the remapping the process identification to an old process identification further comprises:
- determining whether the group includes a second process entry in response to the input process identification not being equal to a real process identification stored in the first process entry; and
- outputting the input process identification in response to the group not including a second process.

16. The apparatus of claim 15, wherein the remapping the process identification to an old process identification further comprises:
- receiving a second process entry for a second process in the group in response to the group including a second process; and
- determining whether the input process identification is equal to a second real process identification stored in the second process entry; and
- outputting a corresponding old process identification in response to the input process identification being equal to the second real process identification.

* * * * *